(12) United States Patent
Ming

(10) Patent No.: US 8,844,821 B2
(45) Date of Patent: Sep. 30, 2014

(54) MULTI-LAYER BARCODE FOR PRINT ON DEMAND DOCUMENT MANAGEMENT

(75) Inventor: Wei Ming, Cupertino, CA (US)

(73) Assignee: Konica Minolta Laboratory U.S.A., Inc., San Mateo, CA (US)

( * ) Notice: Subject to any disclaimer, the term of this patent is extended or adjusted under 35 U.S.C. 154(b) by 0 days.

(21) Appl. No.: 13/557,118

(22) Filed: Jul. 24, 2012

(65) Prior Publication Data

US 2014/0027504 A1    Jan. 30, 2014

(51) Int. Cl.
*G06K 7/10*    (2006.01)

(52) U.S. Cl.
USPC ...................................... 235/462.01

(58) Field of Classification Search
USPC ........... 707/694, 729, 784; 382/306; 235/375, 235/462.01
See application file for complete search history.

(56) References Cited

U.S. PATENT DOCUMENTS

| | | | | |
|---|---|---|---|---|
| 8,294,923 | B2* | 10/2012 | Gonzalez Marti | 358/1.15 |
| 2007/0176001 | A1* | 8/2007 | Cattrone et al. | 235/462.01 |
| 2011/0007343 | A1* | 1/2011 | Hopper et al. | 358/1.15 |
| 2012/0031962 | A1* | 2/2012 | Li et al. | 235/375 |

* cited by examiner

*Primary Examiner* — Ahshik Kim
(74) *Attorney, Agent, or Firm* — Chen Yoshimura LLP

(57) ABSTRACT

A document management method, including the steps of gathering data of a multi-page document for a first layer barcode, encoding the gathered data for the first layer barcode, writing the first layer barcode on at least one page of the document, deriving key information of the document from the gathered data; and for at least one other page of the document, gathering data of the at least one other page for a second layer barcode, encoding key information of the document and the data of the at least one other page for the second layer barcode, and writing the second layer barcode on the at least one other page of the document, such that the at least one other page of the document has its respective second layer barcode.

18 Claims, 4 Drawing Sheets

MULTI-LAYER BARCODE FOR PRINT ON DEMAND DOCUMENT MANAGEMENT

BACKGROUND OF THE INVENTION

1. Field of the Invention

This invention relates to print-on-demand (POD) document management, and in particular, it relates to using barcode for POD document management.

2. Description of Related Art

In a POD project, document identification (ID) is often utilized to manage the published documents. The documents may be a compilation of works assembled into a book or booklet, or a single document having multiple pages, etc. They can be published on paper as traditional hard-copy document, or in an electronic format (such as the portable document format or PDF) as an e-copy document which can be transmitted over a computer network or stored in a database.

It is often desirable in a POD project to keep certain information, such as book related information, registration information, order information, etc., for tracking and other management purposes. One of the approaches is to put these information in a barcode and print it on each page, so that for a printed book, or for even just a page of a book, certain information is readily available, e.g., whether the book is allowed to be reprinted, where does the page come from, etc. However, to keep all such information in one barcode, the barcode may be too big and takes too much space on a page which makes the page look less appealing, especially when a barcode is printed on every page.

SUMMARY

The present invention is directed to a multi-layer barcode for POD document management.

An object of the present invention is to provide a method for POD document management that utilizes multi-layer barcode which includes a first layer barcode containing information about a printed document, and one or more lower layer barcodes containing information about the sections or chapters, and pages of the document.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

To achieve these and/or other objects, as embodied and broadly described, the present invention provides a document management method including the steps of: (a) gathering data of a multi-page document for a first layer barcode; (b) encoding the gathered data for the first layer barcode; (c) writing the first layer barcode on at least one page of the document; (d) deriving key information of the document from the gathered data; (e) for at least one other page of the document, (i) gathering data of the page for a second layer barcode; (ii) encoding key information of the document and the data of the page for the second layer barcode; and (iii) writing the second layer barcode on the at least one other page of the document; such that the at least one other page of the document has its respective second layer barcode.

In another aspect, the present invention provides a non-transitory computer readable recording medium having a computer readable program code embedded therein for controlling a data processing apparatus, the computer readable program code configured to cause the data processing apparatus to execute the process of the above method.

In a further aspect, the present invention provides a system configured to cause a data processing apparatus to execute the process of the above method.

It is to be understood that both the foregoing general description and the following detailed description are exemplary and explanatory and are intended to provide further explanation of the invention as claimed.

DETAILED DESCRIPTION OF PREFERRED EMBODIMENTS

Embodiments of the present invention provide a method of POD document management by using multi-layer barcodes. Using a printed book as an example, the exemplary embodiment of the present invention method utilizes a first layer (or "parent") barcode on the first or beginning page of the book, which can be bigger and contains common information of the book, and a second layer (or "child") barcode on each of the other pages, which can be small and includes page specific information such as where the page is inherited from, verification information, and the other specific information of that page. With this arrangement, common information included in the first layer barcode needs not be repeated in the second layer barcode. Instead, the second layer barcode will have information indicating from where (i.e., the first layer barcode) the common information may be retrieved and will also have a digest of common information from the parent barcode, which may be used as authentication information to identify the first and/or second layer barcode. As a result the second layer barcode only needs to additionally contain page specific information so it can be smaller and does not occupy too much space on the page it is printed on.

Figure 1A:
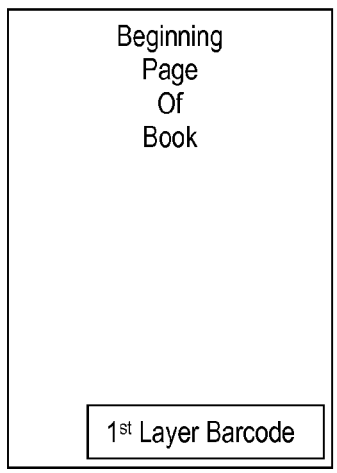
FIGS. 1A, 1B and 1C schematically illustrate multi-layer barcodes printed on various pages of a book according to embodiments of the present invention.
Figure 1B:
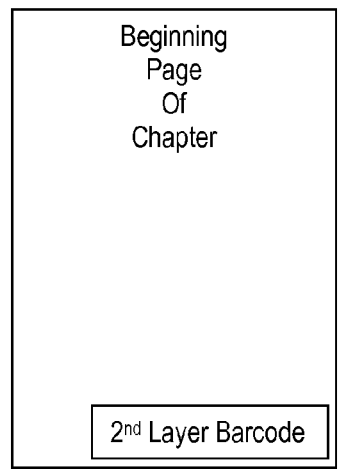
Figure 1C:
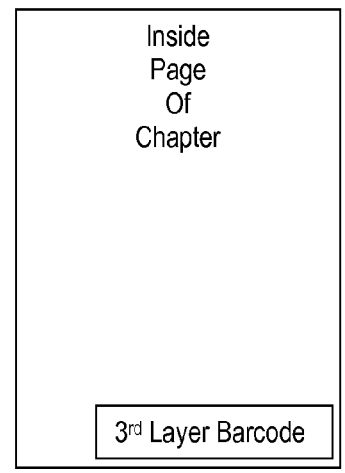

This multi-layer structure may be expanded to more layers. As shown in FIGS. 1A, 1B and 1C as an example, a first layer ("grandparent") barcode may be printed on the beginning page of a multi-chapter book, a second layer ("parent") barcode may be printed on the beginning page of a chapter, and a third layer ("child" or "grandchild") barcode may be printed on each of the pages of the chapter, and so on.

The following is an example of the content in a multi-layer barcode.

In a first layer barcode, it may include the following information:

Book information: title, author, ISBN number, publisher, publish date, copyright information, total pages/chapters, chapter titles, etc.

Registration information: operator name, time-stamp of creation, search index, etc.

Permission information: access permission, reprint permission, allowed maximum reprints, etc.

Order information: order name or number, order price, order history, etc.

In a second layer barcode, it may include the following information:
- Key "parent" information: (1) e.g. time-stamp of creation, and/or search index, and/or ISBN number; and (2) Digest: a digest of book information, registration information and permissions.
- "Child" information: page-specific information, additional copyright information, page reprint permission information, etc.

With the information contained in a second-layer barcode, it is easy to find its "parent" or first layer barcode by checking the time-stamp or index or ISBN number. If there are multiple first layer barcode found, then the Digest can be used for further identification. The Digest may also be used to verify whether the second layer barcode is the "true child" of the first layer barcode, i.e., the second layer barcode is indeed derived from and linked to and dependent upon the first layer barcode. The Digest will contain digested common information from the first-layer barcode such as the book information, copyright information and permission information. However, the order information needs no to be digested, i.e., the Digest does not need to include order information. This is because the second and/or third-layer barcode should only carry the inherent, essential or unchanged information of the first-layer barcode, while the first-layer barcode can have additional information (e.g., order information) for other purposes such as tracking orders, payment record, etc.

The information contained in a second-layer barcode may also be used to find the parent information and process permission, which is useful when a book is compiled from multiple references.

Figure 2A:
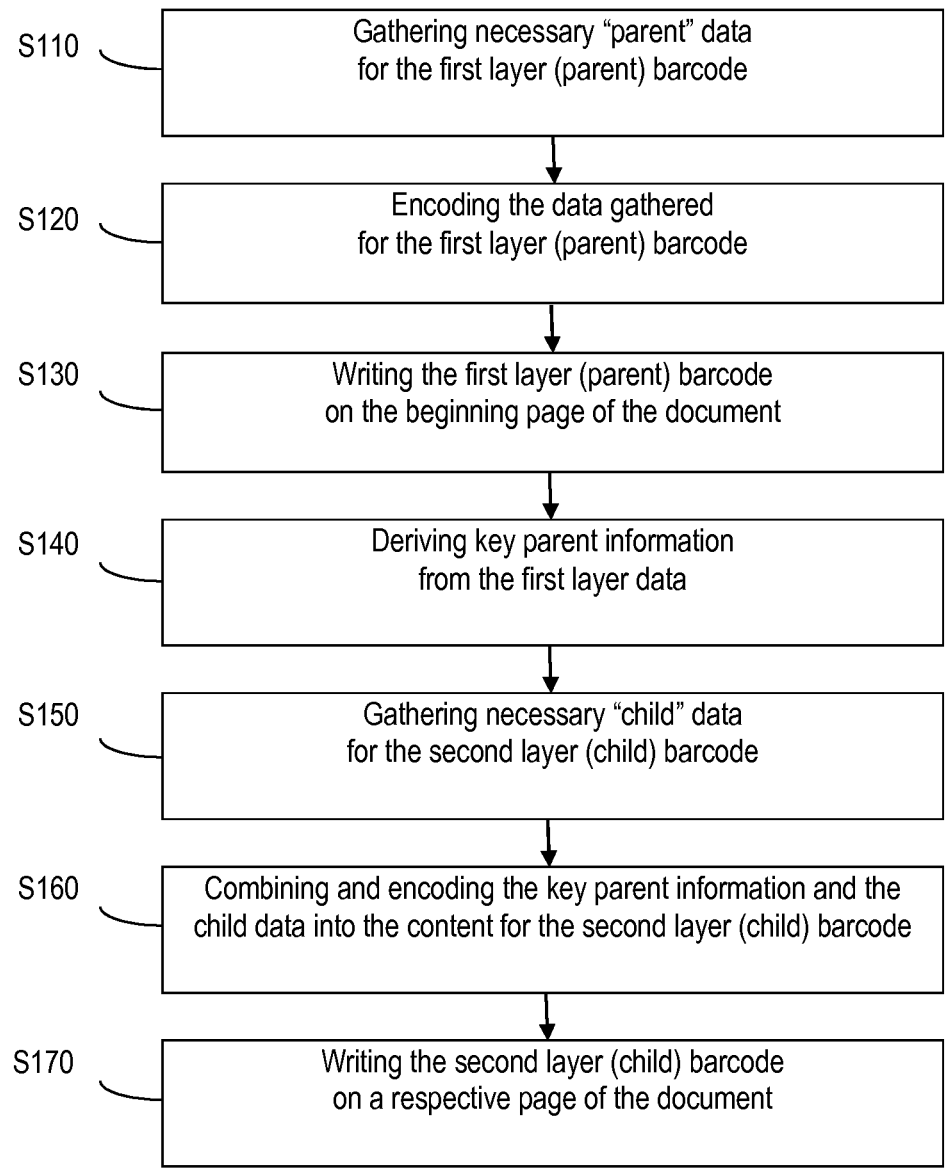
FIGS. 2A and 2B schematically illustrate a method of utilizing multi-layer barcode for POD document management according to embodiments of the present invention.
Figure 2B:
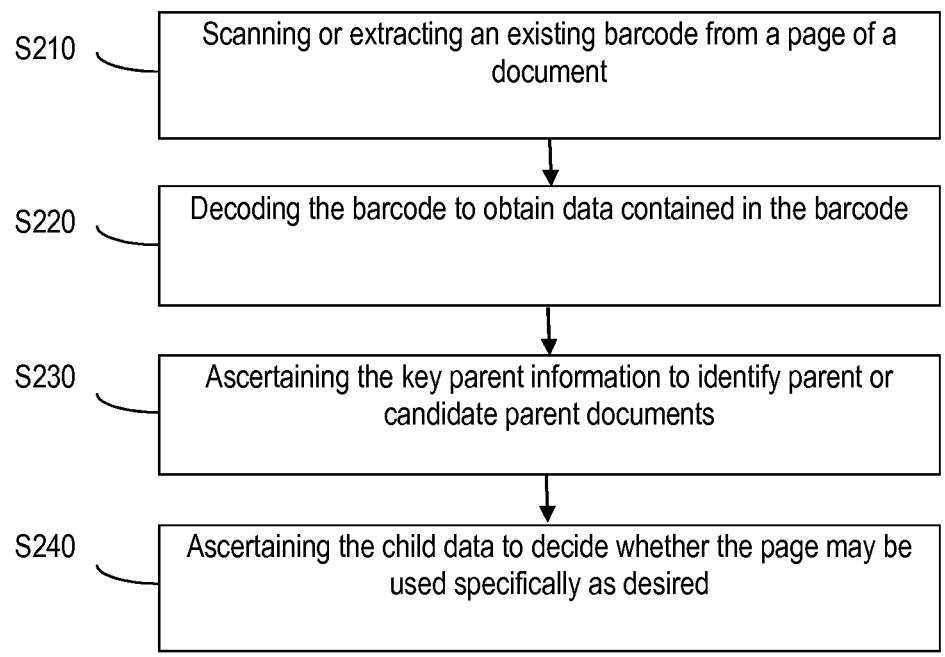

Referring to FIGS. 2A and 2B, there is shown a method of utilizing multi-layer barcode for POD document management according to embodiments of the present invention.

Referring to FIG. 2A, there is shown a process of creating the multi-layer barcode for POD document management according to embodiments of the present invention.

At Step S110, necessary "parent" data are gathered for the first layer or parent barcode. The data may be gathered from user input, and/or extracted from the book itself, and/or obtained from a copyright server, and/or generated by management software itself. Such data may include book information, registration information, permission information, order information, etc.

At Step S120 the gathered data of the first layer barcode are encoded. Any suitable coding scheme may be used. The data could also be encrypted optionally.

At Step S130 the first layer barcode is printed on the beginning page of the book. If the book is published in electronic format (e.g., an e-book) then the barcode is added to the beginning page of the e-book. Alternatively, the barcode could be put in a different layer, so that the display of barcode can be turned ON or OFF.

At Step S140 key parent information are derived from the data gathered for the first layer barcode. Such key parent information may include time-stamp of creation, and/or search index, and/or ISBN number of the book, and a digest of the specific information of the book, which is generated from the data gathered for the first layer barcode and is a digest of, e.g., book information, registration information, permission information, etc. By using a digest, the second/third layer barcode can be much smaller or shorter because, e.g., the digest may be cryptographic hash functions, such as MD5 or SHA-1, with fixed data length of, e.g., 16 or 20 bytes.

At Step S150, necessary "child" data are gathered for the second layer or child barcode. The data may be gathered from user input, and/or extracted from the book itself, and/or obtained from a copyright server. Such data may include chapter title, additional copyright information, page reprint permission information, etc.

At Step S160, the key parent information and the child data are combined and decoded for the second layer (child) barcode. Any suitable coding scheme may be used.

At Step S170 the second layer barcode is printed on a page of the book. If the page is generated in electronic format (e.g., the portable document format or PDF) then the barcode is added electronically to the e-page.

It is noted that each page will have a different child barcode. It can also be customized to have different barcode for each section or chapter of the book.

There are many instances where the multi-layer barcode may be utilized for POD document management. For example, when a user wants to reprint a page for an existing book, the user may use the second layer barcode printed on the page to ascertain whether the page may be reprinted. Another example is when a user wants to find out the original source of a page in a compiled booklet, the user may use the second layer barcode printed on the page to ascertain its "parent" document.

Referring to FIG. 2B, there is shown a process of using the multi-layer barcode for POD document management according to embodiments of the present invention.

At Step 210, the existing barcode is scanned from a page of a printed document. If the document is published in electronic format, the barcode may be electronically extracted.

At Step 220, the scanned or extracted barcode is decoded. Any suitable decoding scheme may be used.

At Step 230, the key parent information contained in the barcode is obtained. With the title and time-stamp of the book, the parent or candidate parent documents of the page can be found, if necessary; further, if needed, the digest contained in the barcode can also be obtained to compare with the calculated digests of the parent or candidate parent documents so that the correct or "true" parent document of the page can be further verified.

At Step 240, the child data contained in the barcode can be used to determine, for example, whether the page may be reprinted, if so desired.

It is noted that a first layer barcode may be similarly scanned or extracted and then decoded so that the information contained therein may be used for identify the document or obtain further information about the document.

The following is an example of a parent barcode data structure in accordance with the embodiments of the present invention:

\*\*\*\*\*\*\*\*\*\*\*\*
Book Info {
Title;
Author;
ISBN number;
Publisher;
Publish date;
Copyright info;
Total pages;
Total Chapters;
Chapter titles;
Chapter pages or range;
}
Registration info {
Operator name;
Timestamp of creation;
Search index;
}
Permissions {
Access permission;

```
Reprint permission;
Allowed maximum reprints;
}
Order Info {
Order name or number;
Order history;
}
************
```

The following is an example of a child barcode data structure in accordance with the embodiments of the present invention:

```
************
Parent Key Info {
Title;
Timestamp of creation or Search Index or ISBN;
Digest (Hash code) of Book Info, Registration info and Permissions;
}
Child Info {
Chapter title;
Reprint permission;
Additional copyright info;
}
************
```

Figure 3A:
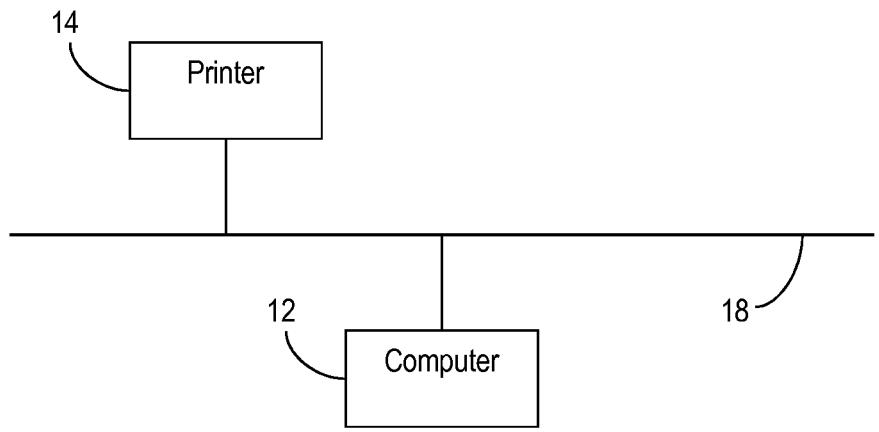
FIGS. 3A and 3B schematically illustrate systems in which exemplary embodiments of the present invention may be implemented.
Figure 3B:
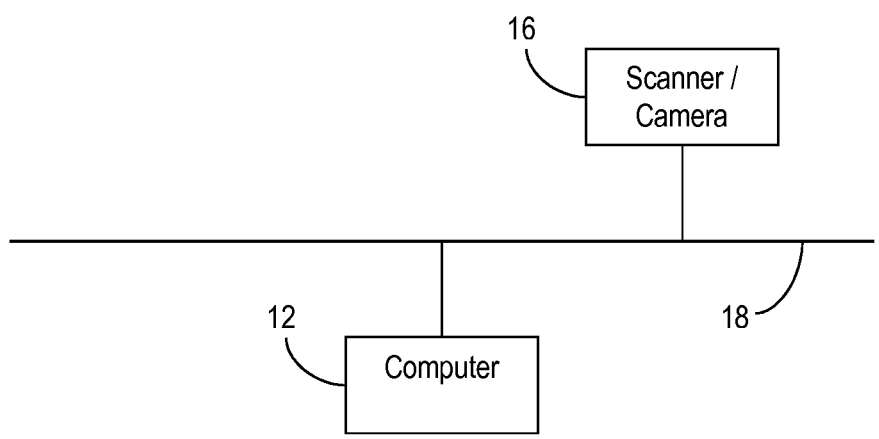

The method of using multi-layer barcode for POD document management described above can be implemented in a system as illustrated in FIGS. 3A and 3B.

Referring to FIGS. 3A and 3B, there are illustrated exemplary barcode systems in which the methods of the present invention may be implemented. In the exemplary embodiment shown in FIG. 3A, the barcode system may include a computer 12 and a printer 14 connected to each other by a network or other wired or wireless communication link 18, where the computer 12 is loaded with a program for encoding the multi-layer barcode in accordance with the embodiments of the invention, so preferably steps S110, S120, S140, S150 and S160 shown in FIG. 2A are performed by the computer 12 but steps S130 and S170 shown in FIG. 2A are performed by the printer 14. However, in another exemplary embodiment of the invention, all steps S110-S170 are performed by the computer 12 to create a digital version of the document with the multi-layer barcode in, for example, PDF file format or any other suitable image format (such as TIFF), and the digital version of the document with the multi-layer barcode may be viewed on the computer 12 or other suitable electronic devices or transmitted to the printer 14 for printing in hardcopy. Still a further exemplary embodiment of the invention is a printer having a processor and a memory loaded with a program for rendering the multi-layer barcode in accordance with the embodiments of the invention, where the printer 14 may be a stand-alone printer not connected with the computer 12, so alternatively all of the steps shown in FIG. 2A are performed by the printer 14.

In the other exemplary embodiment shown in FIG. 3B, the barcode system may include a computer 12 and a scanner or camera 16 connected to each other by a network or other wired or wireless communication link 18, where the computer 12 is loaded with a program for decoding the multi-layer barcode in accordance with the embodiments of the present invention, so preferably step S210 shown in FIG. 2B is performed by the scanner/camera 16 but steps S220, S230 and S240 shown in FIG. 2B are performed by the computer 12. However, another exemplary embodiment of the invention is a scanner/camera 16 having a processor and a memory with a program for decoding the multi-layer barcode in accordance with the embodiments of the present invention, where the scanner 16 may be a stand-alone scanner/camera not connected with the computer 12, so alternatively all of the steps shown in FIG. 3B are performed by the scanner/camera 16.

In addition, in many practical applications, the encoding and decoding process may be carried out at different locations, and the printer 14 and scanner 16 (or some other imaging device, such as camera) do not necessarily communicate with each other at the same time. For example, a common practice today is that advertisers print barcodes next to their product commercials on fliers, and customers can simply read the barcodes with their smart phones cameras to obtain additional information about the products encoded in the barcodes.

Furthermore, although in many instances the exemplary embodiments of the invention is implemented in a print-scan loop, it is understood that computers, printers and/or scanners can each individually function to perform certain part of the exemplary process of the process of the invention. For example, a computer may be used to generate/encode and/or decode a barcode, a printer may be used generate and/or print a barcode, while a scanner or a camera may be used to read and/or decode a barcode. From a practical application viewpoint, it is not necessary to have all of the devices connected in a network or connected to each other. Furthermore, multi-function printers (MFP) and All-In-One (AIO) devices may also be used in place of the printer or scanner for generating/capturing barcodes.

Therefore in the above described aspect, the invention may be embodied in a data processing system including computers/servers and printers or scanners/cameras. Yet still in another aspect, the invention may also be embodied in a computer program product embodied in computer usable non-transitory medium having a computer readable program code embedded therein for controlling a data processing apparatus to carry out the process of the invention as described above.

It will be apparent to those skilled in the art that various modification and variations can be made in the method and related apparatus of the present invention without departing from the spirit or scope of the invention. Thus, it is intended that the present invention cover modifications and variations that come within the scope of the appended claims and their equivalents.

What is claimed is:

1. A document management method comprising:
    gathering data about a multi-page document for a first layer barcode;
    encoding the gathered data for the first layer barcode;
    writing the first layer barcode on at least one page of the document;
    deriving key information about the document from the gathered data;
    for at least one other page of the document,
        gathering data about the at least one other page for a second layer barcode, the gathered data including one or more of the following: page-specific information, additional copyright information, and page reprint permission information;
        encoding key information about the document and the data about the at least one other page for the second layer barcode; and
        writing the second layer barcode on the at least one other page of the document;
    such that the at least one other page of the document has its respective second layer barcode.

2. The method of claim 1, wherein the data about the document gathered for the first layer barcode comprises one or more of the following: document information, registration information, permission information, and order information.

3. The method of claim 2, wherein the document information comprises one or more of the following: title, author, ISBN number, publisher, publish date, copyright information, total pages, total sections, and section titles.

4. The method of claim 2, wherein the registration information comprises one or more of the following: operator name, time-stamp of creation, and search index.

5. The method of claim 2, wherein the permission information comprises one or more of the following: access permission, reprint permission, and allowed maximum reprints.

6. The method of claim 1, wherein the key information about the document comprises one or more of the following: time-stamp of creation, search index, and ISBN number.

7. The method of claim 6, wherein the key information about the document further comprises a digest of one or more of the following: document information, registration information and permission information.

8. The method of claim 1, further comprising:
for at least one section of the document,
gathering data about the at least one section for an intermediary layer barcode;
encoding key information about the document and the data about the at least one section for the intermediary layer barcode; and
writing the intermediary layer barcode on at least one page of the at least one section;
such that the at least one page of the at least one section of the document has its respective intermediary layer barcode.

9. The method of claim 1, further comprising:
extracting a second layer barcode from a page of the document; and
decoding the second layer barcode to obtain key information about the document and the data of the page.

10. The non-transitory computer readable recording medium of claim 1, wherein the key information about the document comprises one or more of the following: time-stamp of creation, search index, and ISBN number.

11. The non-transitory computer readable recording medium of claim 10, wherein the key information about the document further comprises a digest of one or more of the following: document information, registration information and permission information.

12. A non-transitory computer readable recording medium having a computer readable program code embedded therein for controlling a data processing apparatus, the computer readable program code configured to cause the data processing apparatus to execute a process for document management, the process comprising:
gathering data about a multi-page document for a first layer barcode;
encoding the gathered data for the first layer barcode;
writing the first layer barcode on at least one page of the document;
deriving key information about the document from the gathered data;
for at least one other page of the document,
gathering data about the at least one other page for a second layer barcode, the gathered data including one or more of the following: page-specific information, additional copyright information, and page reprint permission information;
encoding key information about the document and the data about the at least one other page for the second layer barcode; and
writing the second layer barcode on the at least one other page of the document;
such that the at least one other page of the document has its respective second layer barcode.

13. The non-transitory computer readable recording medium of claim 12, wherein the data about the document gathered for the first layer barcode comprises one or more of the following: document information, registration information, and permission information.

14. The non-transitory computer readable recording medium of claim 13, wherein the document information comprises one or more of the following: title, author, ISBN number, publisher, publish date, copyright information, total pages, total sections, and section titles.

15. The non-transitory computer readable recording medium of claim 13, wherein the registration information comprises one or more of the following: operator name, time-stamp of creation, and search index.

16. The non-transitory computer readable recording medium of claim 13, wherein the permission information comprises one or more of the following: access permission, reprint permission, and allowed maximum reprints.

17. The non-transitory computer readable recording medium of claim 12, wherein the process further comprises:
for at least one section of the document,
gathering data about the at least one section for an intermediary layer barcode;
encoding key information about the document and the data about the at least one section for the intermediary layer barcode; and
writing the intermediary layer barcode on at least one page of the at least one section;
such that the at least one page of the at least one section of the document has its respective intermediary layer barcode.

18. The non-transitory computer readable recording medium of claim 12, wherein the process further comprises:
extracting a second layer barcode from a page of the document; and
decoding the second layer barcode to obtain key information about the document and the data of the page.

* * * * *